United States Patent

[11] 3,576,535

[72] Inventor Anthony E. Turner
Phoenix, Ariz.
[21] Appl. No. 711,429
[22] Filed Mar. 7, 1968
[45] Patented Apr. 27, 1971
[73] Assignee Motorola Inc.
Franklin Park, Ill.

[54] SUPERVISORY CONTROL SYSTEM
10 Claims, 3 Drawing Figs.
[52] U.S. Cl. .................................................. 340/147,
318/20, 330/9, 330/51, 340/150
[51] Int. Cl. ...................................................... H02h 9/00,
H03f 1/02, H03l 1/14
[50] Field of Search.......................................... 340/147,
150; 330/9, 10, 51; 318/20.070, 20.395

[56] References Cited
UNITED STATES PATENTS
3,290,563 12/1966 Hyer et al. ..................... 330/51UX
3,422,327 1/1969 McBrayer et al. ............. 318/20.070UX
3,443,235 5/1969 Newbold ....................... 330/51X Primary Examiner—Donald J. Yusko
Attorney—Mueller and Aichele ABSTRACT: A supervisory control system having three independent control links each capable of independently supplying a signal to direct a process being controlled. A first one of the control links embodies direct digital control; the second, automatic or semiautomatic analog control; and the third, manual control. The first control link includes an analog memory amplifier-receiving analog signals from a central control unit and supplying an output analog control signal. The second control link includes a known type analog controller controllable by an analog memory amplifier which is preset during direct digital control. The condition-indicating signal of the controlled process is supplied as the variable input to the controller such that transfer between the first link and the second link is "bumpless." The process variable signals are returned to a digital control element which integrates the variables in the system. The analog control signal from a digital control element is multiplexed to a plurality of process control stations, each of which has three independent controllers. Address selection is provided.

PATENTED APR 27 1971 3,576,535
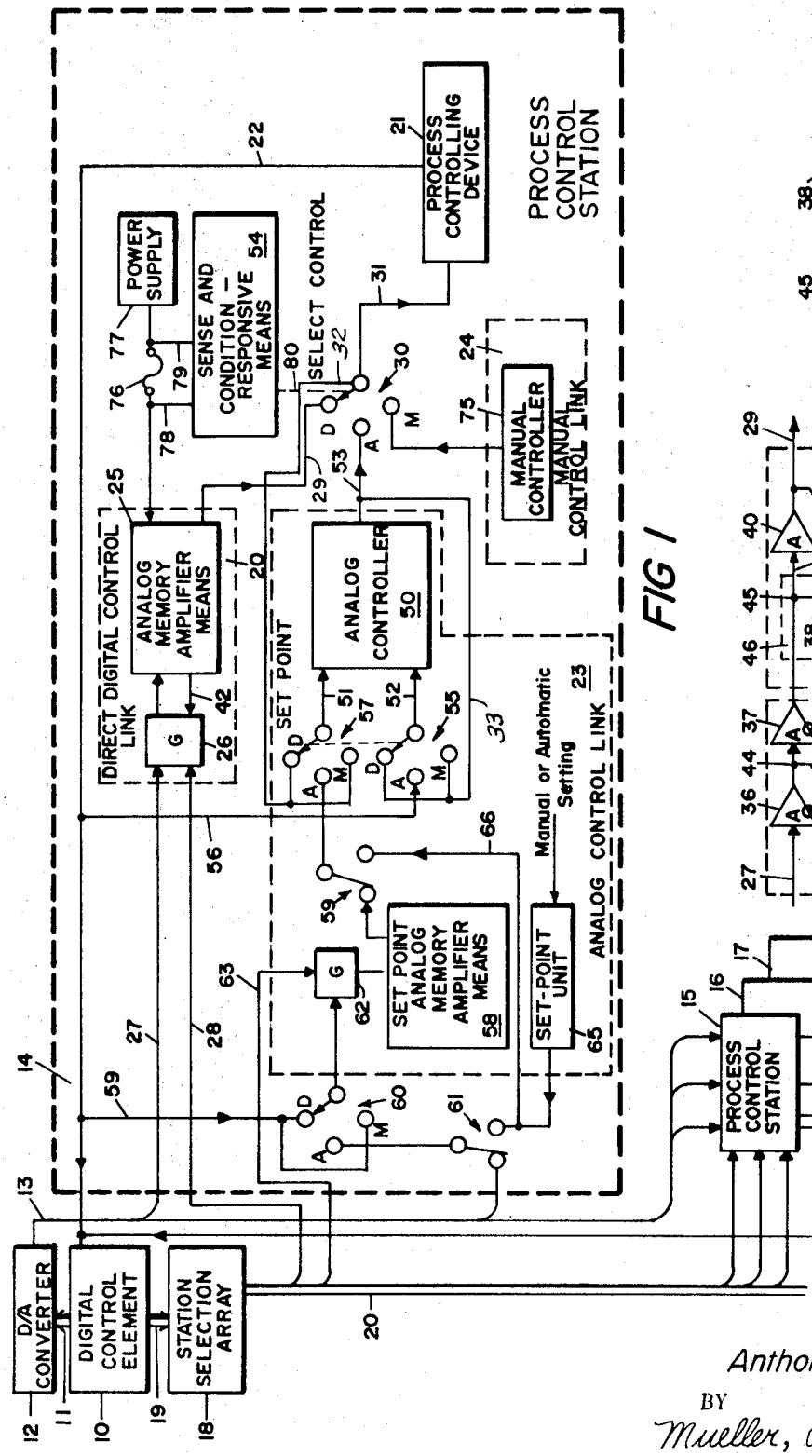
FIG 1
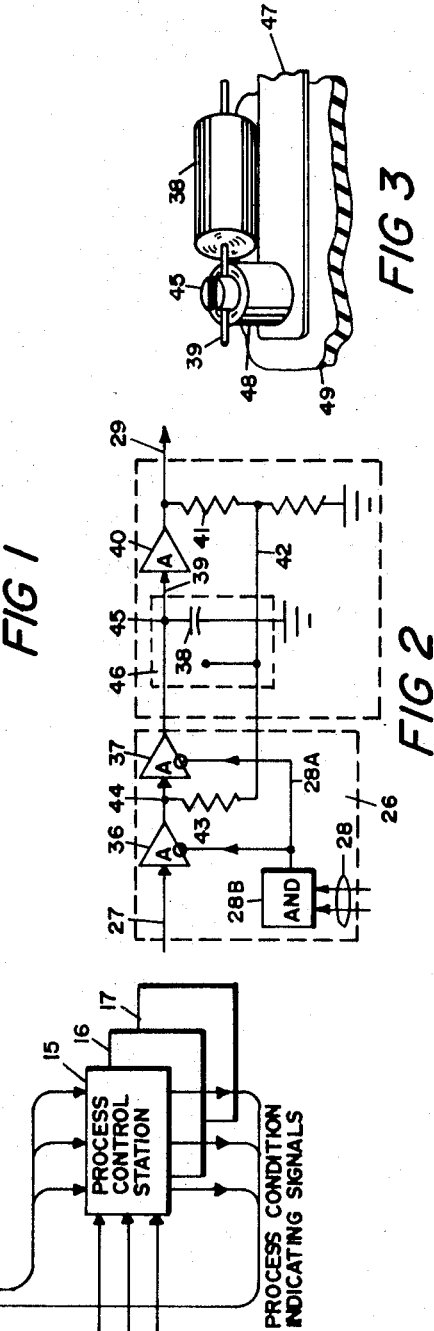
FIG 2
FIG 3
INVENTOR.
Anthony E. Turner
BY
Mueller, Aichele, & Rauner
Atty's

SUPERVISORY CONTROL SYSTEM

BACKGROUND OF THE INVENTION

This invention is related to that disclosed in an application of Lawrence R. Smith, Ser. No. 711,430 entitled "Supervisory Control System" filed Mar. 7, 1968 and assigned to the same assignee as the subject application.

This invention relates to supervisory control system and particularly to those systems capable of using direct digital control, analog control, or manual control.

Supervisory control systems can be characterized as being of two general types. A first and common type is so-called incremental value system, while a second is a true-value system. Other terms for the incremental value system are "incremental algorithm" or "velocity algorithm." Another name for the true-value system is "true-position algorithm." In an incremental value system the control signals indicate to a process-controlling device whether to increase, decrease, or make no change. Such signals are repeated until the process-controlling device has changed to the desired position. Expressed in another way, the process-controlling device is the integrator in the system. That is, it sums the control signals to provide a true-control position. In a true-value system, the controlling element generates signals indicating the desired or true value of the process-controlling device. These signals are sent to the process-controlling device and it responds by adjusting itself to such desired value or position in accordance with its predetermined characteristics. In the true-value system the integrating is accomplished in the controlling element rather than in the process-controlling device. Such a control element may either be analog or digital in character.

In emergency situations, an operator may have to assume manual control of a supervisory control system. In the incremental type of control system, the operator has to exercise control by means of a toggle switch, for example, which would indicate to the process-controlling device to increase or decrease. Such control requires constant attention by the operator. In a true-value system, operator intervention is characterized by the operator adjusting a dial to indicate in some manner the desired true position of the process-controlling device. It does not necessarily require operator attention at all times.

Various control elements for supervisory control systems are divided into two broad categories, digital and analog. As used herein, the term "analog" means a supervisory control system in which the amplitude of electrical signals indicates a numerical value, while the term "digital" indicates that the presence or absence of signals, irrespective of the amplitude, indicates arbitrarily selected numerical values. Such elements may be used in either the incremental value or true-value systems described above. A combination of digital and analog controlling elements are often found in supervisory control systems. For example, digital-controlling elements may generate a set of digital signals which are then converted to an analog control signal. Such analog control signal is then utilized as a set point for an analog controller which controls the process-controlling device.

An example of a digital unit supplying signals to an analog controller is described by H.S. Tsien et al. in the American Rocket Society Journal, July 1952, pages 192 et seq. in an article entitle "Automatic Natigation of a Long Range Rocket Vehicle." The Tsien et al. system is a true-value system. Similarly, a digital and analog combination for an incremental control system is described by Marson in an article entitled "Output and Standby Equipment for Direct Digital Control" in the Magazine CONTROL, page 137 et seq., Mar. 1965, FIG. 2.

Digital equipments have many applications in supervisory control systems and many advantages in that insofar as equipment variations are concerned, they are drift free because the information or quantities are represented by discrete signals as opposed to analog signals wherein amplitudes represent values, which are subject to drift, and therefore error. If a digital equipment-controlled process is subjected to drift, the digital equipment when programmable can be reprogrammed or the program may be "fixed."

Digital equipment, when used as a computational device, can by much faster than analog devices thereby a single digital control element, such as a computer, may be time shared by a plurality of analog control devices. This time sharing of the digital control element can improve performance of the system in that if it is programmed, any errors in the logic design or algorithm can be corrected by merely changing the program rather than modifying equipments. For this reason and others, it is desirable to provide a digital control element for a supervisory control system which controls a large plurality of remote process control stations.

If an incremental value system were to be adopted, then the digital control unit computes each increment and supplies it to the analog controller. This arrangement is wasteful in that a lot of digital control element time is consumed in keeping track of the incremental system performance. Digital control element time can be quite expensive. Therefore, in a supervisory control system having a central digital control element, it is desirable to adopt a true-value system. Further, in an incremental system with the integration being accomplished in an analog device, such analog quantities are subject to drift due to equipment performance. In a true-value system, the digital control element performs the integration and supplies a drift-free control signal.

It is unquestionable that in a true-value system the computation performed in a digital control element will be the most accurate and the most stable. However, digital control elements, as well as connecting control links, are subject to malfunctions. In controlling processes or other operations, it is desirable in several instances to continue operations even through a digital control unit and its communication network are not functioning, are functioning improperly, or have in some manner created an error which would be adverse to the successful performance of the process. Such continuation should not have an adverse affect on system operation.

A low cost process control system utilizing a central digital control element for a large plurality of process control stations, some of which may have a wide geographic distribution, requires a time sharing by the various stations of communication networks and the digital control element. Such time sharing requires a reliable memory capability at each process control station for remembering the control signal. If digital signals are transferred to each station, then such memory capability may be of the digital type. Additionally, each station requires a digital-to-analog converter to effect control over a process parameter. For a truly low cost process control system a single digital-to-analog converter could be located at the central digital control element. Then some system of multiplexing is required to supply a time-shared communication network which caries a sequence of analog control signals to a plurality of process control stations.

SUMMARY OF THE INVENTION

It is an object of the invention to provide an improved process control station with long term electrically alterable electronic storage of analog control signals receivable on a time-shared basis.

It is another object of this invention to provide an improved supervisory control system having a digital control element which has a "bumpless" backup system for assuming control of a control process whenever the digital control unit fails.

It is a further object of this invention to provide bumpless transfer of control between a plurality of control links in a control system.

A feature of this invention includes parallel control links, one of which is digital controlled and another of which automatically follows the process performance and is capable of assuming control of the process upon malfunction of the digital control unit without introducing unnecessary transients into the process.

Another feature of the invention is the provision of a supervisory control system having an analog memory unit in a direct digital control link and a similar analog memory unit in an analog-controller link with the memory unit in the analog link automatically following the process control signal variations as controlled by the direct digital link. All the controlling links can supply similar control signals indicative of the desired condition of the process.

Apparatus incorporating this invention includes a direct digital system for supervisory control when a first analog memory unit receives analog input signals from a digital control element and stores them for an indefinite period of time. The analog memory amplifier continuously supplies an analog control signal indicated by the stored analog signal to a process-controlling device. An analog control link is provided which is connected to the process for receiving and automatically tracking the continuously supplied control signal from the first control link. A second analog memory amplifier continuously receives the process condition indicating signals for storing same. Upon a malfunction in the direct digital control link, or for other reasons, condition responsive means switch the control from the digital control link to the analog control link. Input connections to the analog controller are switched to the second analog memory amplifier. The set point input of the analog controller is then received from the second or set point analog memory amplifier while the control input is the process condition-indicating signal. In addition, a manual controller is a manual control link is provided. Switching means select one of the three control links for controlling a process-controlling device. All three of the control links are in parallel system relationship insofar as the process-controlling device is concerned. A set point unit is connected in parallel with the second analog memory amplifier such that it may be used as an alternate set point source to the second analog memory amplifier.

A digital control element supplies digital-controlling signals to a single digital-to-analog converter. An output analog signal from the converter is supplied to a plurality of process control stations. Each process control station receives such analog signals and selectively supplies them to the first analog memory amplifier in each of the respective stations. The converter supplied analog signal is also selectively available to the second analog memory amplifier in each of the process control stations. The process condition-indicating signals are supplied from every process control station to the digital control element. Each of the process control stations include gating means which receive station selection signals from the digital control element via a station selection array. These station selection signals open gates for selectively passing analog signals to the analog memory amplifiers in the respective process control stations. In this manner, only one analog signal line need be provided between the D/A converter and a plurality of process control stations. Since a station-selection array is provided adjacent a digital control element, the number of lines between the central station and the plurality of remote stations is equal to twice the square root of the number of remote stations.

THE DRAWING

FIG. 1 is a block diagram illustrating a system incorporating the teachings of the present invention and schematically showing details of a novel process control station in the system.

FIG. 2 is a block-schematic diagram of an analog memory amplifier and its input gates usable with the FIG. 1 system.

FIG. 3 is a diagrammatic showing of the connection and support of an analog memory element usable with the FIG. 2 memory

DESCRIPTION OF THE ILLUSTRATIVE EMBODIMENT

Like numbers indicate like parts in the various diagrams and view. The FIG. 1 illustrated supervisory control system includes central station digital control element 10 having a stored program for computing true-value process input signals. Cable 11 carries such digital process input signals from digital control element 10 to digital-to-analog converter 12. Converter 12 supplies corresponding analog input signals over line 13 to a plurality of process control stations 14, 15, 16 and 17. A much larger plurality of process control stations may be provided for the system. Station 14 is illustrated in detail flow chart form; it being understood that the other stations 15, 16 and 17 may be constructed in accordance with the showing of station 14. Depending upon a process being controlled, the process-controlling device in the respective stations may be different or identical.

In order to reduce the number of wires between the central station digital control element and a large plurality of remotely located process control stations, station-selection array 18 decodes digital address signals received from digital control element 10 over cable 19. Station-selection array 18 consists of a decoder for decoding a large number of parallel-received signals into a smaller plurality of decoded signals, as is well known in the digital and computer communication arts. The decoded signals are supplied over cable 19a to all of the process control stations 14—17, two separate lines are connected to each station.

In station-selection array 18, for example, if there are 100 remote stations; then the maximum number of lines between array 18 and the remote stations would be 100, i.e., one line for each remotely located process control station. By providing two address lines for each station, the number of station-selection lines between array 18 and the various stations is equal to twice the square root of the number of stations, or 20 in this particular example. The "trade-off" for building a single array or large plurality of station decoders versus the cost of the address signal lines is a matter of design choice.

As shown in FIG. 1, process control station 14 consists of three control links 20, 23 and 24. First control link 20 is utilized for direct digital control; that is, signals received from digital control element 10 via digital-to-analog converter 12 directly controls the process-controlling device 21. A process condition-indicating signal is supplied over line 22 directly to the digital control element 10 as well as to selected portions of the remote process control station 14, as will be explained. Digital control element 10 has an analog digital converter (not shown) for digitizing the supplied condition-indicating signal. Second control link 23, also termed the analog control link, is utilized as a backup control link for direct sign digital control link 20. Control link 23 can be operated either automatically or semiautomatically. By backup to the direct digital link 20, it is meant that second control link 23 assumes control of the process variable being affected by process-controlling device 21 whenever it is desired or necessary to remove control of process-controlling device 21 form from first control link 20. As an example, a malfunction occurring within direct digital control link 20 may cause an automatic transfer of control to link 23. It should be observed that analog control link 23 is in parallel system relationship to direct digital control link 20.

Third control link 24 includes manual controller 75 for "hard" manual control. Such a manual controller is used in the event of failure or malfunction of either or both control links 20 and 23. Actuation and control of process-controlling device 21 may also be transferred to the third manual control link 24 at the discretion of the operator. In order to provide bumpless transfer from manual control link 24 back to automatic or semiautomatic control, second control link 23 automatically tracks the operation of third control link 24 in the same manner as it tracks the control of process-controlling device 21 by direct digital control link 20. In the present illustration, the tracking of the control is performed by sensing and storing the condition-indicating signal supplied over line 22 and thence over line 56 to control link 23.

Direct digital control link 20 includes analog memory amplifier 25 having an input connection through analog input signal gate 26. The analog input signal supplied by digital-to-analog converter 12 over line 13 is continuously supplied to gate 26 of station 14 as well as to corresponding gates in all of the illustrated process control stations 15—17. Gate 26 is selectively opened by station address signals applied over line 28 to pass the appropriate analog signals reaching gate 26 over line 27 within station 14. When digital-to-analog converter 12 is supplying an analog input signal on line 13 which is intended to be stored in an analog memory amplifier means 25, digital control element 10 simultaneously supplies digital station selection signals to array 18 which decodes same to supply a set of stations selection signals over line 28 for opening gate 26. As soon as analog memory amplifier means 25 receives a new analog input signal, a corresponding changed analog control signal is supplied over line 29 through selection switch 30 to process-controlling device 21. The rate of change in the process is limited by the reaction of process-controlling device 21, it being understood that the analog memory amplifier means 25 substantially instantaneously supplies an analog control signal in accordance with received analog input signals. Of course, the condition-indicating signal on line 22 correspondingly changes and is stored within second control link 23 (through line 59) reflecting the change in control affected by digital control element 10. All process performance tracking for backup is performed within the remote process control station.

Analog memory amplifier means 25 is illustrated in simplified schematic form in FIG. 2 with the capacitive element 38 of the memory amplifier being illustrated in diagrammatic form in FIG. 3. An analog input signal on line 27 is passed through first input gating stage 36 and thence through second input gating stage 37 to capacitive memory element 38. Input gating stages 36 and 37 each consists of an insulated-gate field-effect transistor (IGFET). The gate electrodes of the IGFETS are joined to line 28A, the drain electrodes are respectively the input connections to the gating stages 36 and 37, the source electrodes are respectively the output connections of gating stages 36 and 37 while the substrates are electrically unconnected. When gating stages 36 and 37 are conductive, as caused by a signal on line 28A, the respective IGFET's provide an extremely low impedance signal path between the source and drain electrodes. Therefore the analog input signal is faithfully supplied through gate 26 for storage in memory element 38.

Gate 26 is selectively opened when the station selection signals are supplied over lines 28 to AND circuit 28B which combines them in a known manner into a signal digital gate control signal on line 28A. For example, a relatively positive signal on line 28A opens gate 26 while a negative signal closes the gate. The signal passed through gate 26 is stored in the capacitor 38 as an electric charge and is sensed by the voltage magnitude appearing across the capacitor. The voltage magnitude is supplied over line 39 to unity-gain output amplifier 40 which has an exceedingly high input impedance. Such input impedance is provided by connecting the capacitive memory element 38 to a gate electrode of an IGFET. Output amplifier 40 supplies its output signal over line 29 to switch 30 (FIG. 1). The signal on line 29 is also supplied through voltage divider 41, thence over feedback line 42 through resistor 43 to junction 44 between the input gating stages 36 and 37. Output amplifier 40 is preferably a unity-gain amplifier, such that when gate 26 is closed (the IGFETS have a high impedance between source and drain electrodes) the voltage on junction 44 is substantially equal to the voltage on junction 45. This action minimizes leakage through input gating stage 37. There are additional possible leakage paths to other portions of the circuit. Leakage through these additional paths is minimized by a guard plane indicated in FIG. 2 by dashed-box 46. Metallic layer 47, FIG. 3, constitutes the guard plane of a physical embodiment and is connected to feedback line 42 for receiving the output signal of line 29 which is substantially identical to the voltage at junction 45. Therefore essentially zero voltage is provided across high quality insulating post 48 which practically eliminates leakage through that path. Further, if tubular capacitor 38 is pushed against the supporting substrate 49 it will first contact metallic layer 47 reducing any possible leakage through the walls of the capacitor element 38.

Referring again to FIG. 1, analog control link 23 includes analog controller 50 of known design, having input signal means consisting of a pair of differential input connections 51 and 52. Its output control signal is supplied over output signal means line 53 to terminal A of switch 30. As explained later, switch 30, shown as a manually actuated single-pole triple-throw switch, is automatically actuated as indicated by dotted line 80 from sensing and condition-responsive means 54. Additional switches 55, 57 and 60 are ganged with switch 30 for simultaneous actuation by condition-responsive means 54. When switch 30 is set to terminal D the direct digital control link 20 controls process-controlling device 21, when set to terminal A analog control link 23 effects control over device 21 and when set to terminal M manual control link 24 effects control over process-controlling device 21.

With the switches set as shown, direct digital control link 20 supplies the analog control signal over lines 29 and 31 to device 21. The analog condition-indicating signal on line 22 is supplied over line 56 to terminal A of switch 55. The analog control signal on line 31 is fed back over line 32 to terminal D and terminal M of switch 57. Therefore, during direct digital control and during manual control the analog control signal is supplied to input terminal 51 of analog controller 50. In this manner analog controller 50 tracks the analog control signal. The signal output means line 53 of analog controller 50 is connected to the D and M terminals of switch 55 which connects the output of the controller 50 to input connection 52. This completes the connection for effecting automatic tracking of the process being controlled to provide a bumpless transfer from either digital control link 20 or from manual control link 24.

In addition to controller 50 automatically tracking the analog control signal supplied over line 32 when on direct digital control an input signal (condition-indicating signal) to set-point analog memory amplifier means 58 as shown on line 59 is connected to both the D and M terminals of switch 60. Gate 62 is electrically interposed between the output terminal of switch 60 and the input of set-point analog memory means 58. When so interposed, digital control element 10 must periodically send station selection address signals over line 63 to selectively open gate 62 for permitting the condition-indicating signal to be stored in set-point analog memory amplifier means 58. The output of set-point analog memory amplifier 58 is supplied through switch 59 to terminal A of switch 57. Therefore, when condition-responsive means 54 sets the respective switches to the A terminals, analog controller 50 receives its set-point signal from set-point analog memory amplifier 58. Switch 55 being set to its A terminal passes the condition-indicating signal from line 56 to input 52; these connections are recognized as a standard connection to an analog controller from analog control for process control devices. Switch 60, on the input portion of set-point analog memory amplifier means 58, is set to terminal A for receiving a set-point signal from the converter 12 via line 13 nd switch 61. In the latter instance, gate 62 is selectively opened by digital control element 10 through the emission of station-selection address signals.

Additional versatility to the analog control link is provided by set-point unit 65. Unit 65 by may be manual or automatic. This unit can be a slide wire unit automatically set by a servomotor or may be a manually adjusted set-point unit. Set-point unit 65 supplies this set-point signal over line 66 to switch 59. By resetting switch 59 to the illustrated unconnected terminal, set-point unit 65 supplies a set-point signal to terminal A of switch 57. In this manner, when analog control link 23 is selected, a predetermined set point is supplied through analog controller 50 for controlling process device 21 when a bumpless transfer is not mandatory. Also line 66 is connected to switch 61 for selectively supplying its set-point signal to the terminal A of switch 60 for resetting the stored set point and analog memory amplifier means 58. With the above-described connections, set-point analog memory amplifier means 58 initially stores the condition-indicating signal from process-controlling device 21. Subsequent to switching control from either links 20 or 24 to analog control link 23, the operator may adjust set-point unit 65 to a predetermined value and then switch control of the process to set-point unit 65. Also, the operator may adjust set-point unit 65 to stored set-point signal of amplifier means 58 and then manually adjust set-point unit 65 to bring the process to a different state of operation, as desired.

Automatic transfer of control between the various independent control links may be effected by condition-responsive means 54. As shown, power supply 77 supplies power through fuse 76 to independent control link 20. Upon a short circuit in an analog memory amplifier means 25, for example, fuse 76 opens causing a large potential difference between lines 78 and 79. This potential difference is sensed in a normal manner by condition-responsive means 54 which resets switches 30, 55, 57 and 60 simultaneously to the respective A terminals. It is understood that condition-responsive means 54 may be responsive to other parameters including process parameters for switching control from any one of the three links to any other one of the three links. In switch 60, terminals D, A, and M are termed link-selecting terminals.

I claim:

1. A process control station for effecting a control function in a process-controlling device by supplying a true-value analog control signal over an output line, a device supplying a condition-indicating signal, the improvement including in combination, a first control link connected to said output line and receiving said true-value analog control signal for supplying the analog control signal, a second control link having an electronic analog memory-amplifying means and an analog controller with an input signal means and an output signal means, said second control link receiving at least one of said signals and being responsive to said received signal to adjust said controller to be capable of independently supplying a backup analog control signal substantially identical to said analog control signal supplied by said first link, said input signal means consists of first and second input portions and said analog controller output signal means being connected to first input portion for supplying said backup analog control signal thereto and said output line being connected to said second input portion for supplying said analog control signal thereto, and, said condition-indicating signal being supplied to said electronic analog memory amplifying means and said electronic analog-memory amplifying means supplying a signal to said input signal means to adjust said analog controller to the condition of a process being controlled.

2. The process control station of claim 1 wherein said first control link has an electrically alterable analog memory with amplifier means for supplying said analog control signals.

3. The process control station of claim 2 further including output line-switching means for selectively connecting said output line to said first control link for receiving said analog control signal or to said second control link analog controller for receiving said backup control signal.

4. A process control station as set forth in claim 3 wherein said output line-switching means includes condition-responsive means operatively associated with said first control link and responsive to a predetermined condition in said first control link to actuate said output line-switching means to switch to said second control link.

5. The process control station of claim 1 wherein said first control link includes an electrically alterable electronic-type analog memory amplifier for storing and supplying said analog control signal and having an input gating portion for receiving analog input signal to alter the stored signal, a third control link having a manual controller supplying a predetermined analog control signal, switching means electrically interposed between said output line of all of said control links for selectively connecting any one of said control links to said output line, and further switching means in said second control link selectively interconnecting said analog controller input signal means to said electronic analog-memory amplifying means and for disconnecting said output line from said electronic analog-memory amplifying means.

6. The process control station of claim 1 wherein said first control link has an electrically alterable electronic-type analog memory amplifier for supplying said analog control signal and further including input gating means for receiving an analog input signal to be stored, digital control element means including station-selection means and digital analog converter means, said converter means and said station-selection means being connected to said input gating means for selectively supplying an analog input signal to said analog memory amplifier of said first control link and said process-controlling device supplying said condition-indicating signal to said digital control element.

7. A process control system having a central station for monitoring and effecting a control over a plurality of remote stations, each of said remote stations having a process-controlling device responsive to an analog control signal for effecting a function and supplying a condition-indicating signal indicative of the function being effected, the improvement including in combination, a digital control element in said central station operative to supply digital control signals, a digital-to-analog signal converter means in said central station responsive to said digital control signals to supply an analog input signal indicative of said digital control signals, said converter supplying said analog signals to all of said remote stations, means in the digital control element receiving said condition-indicating signals from all of said remote stations, station-selection array means in said central station for supplying selection signals to said remote stations with each remote station being responsive to a unique set of station-selection signals to accept said analog input signal only when indicated by said station-selection signals, each station including a plurality of independent control links selectively connectable to an output control line for furnishing an analog control signal to a process-controlling device, a first one of said control links being jointly responsive to an analog signal supplied by said converter and to its unique set of station-selection signals to store said analog input signal and supply an analog control signal substantially identical to said stored analog input signal, a second control link selectively jointly responsive to said analog input signal and to said station-selection signals unique to the respective station for receiving and storing said analog input signal and selectively operative to supply an analog control signal to said output line, switching means electrically interposed between said first and second ones of said control links for selecting the analog control signal, means in said second one of said control links for receiving and storing said condition-indicating signal and operative to supply a signal indicative of the condition of the process being controlled as an analog control signal.

8. The system of claim 7 wherein each remote station further includes a third control link having a manual controller and said switching means operative selectively connect any one of said control links to said output line.

9. The system of claim 7 wherein said first and second control links each have an electrically alterable electronic-type analog memory amplifier for storing and receiving said analog input signal and said second control link having an analog controller selectively receiving said condition-indicating signal as a set point input and said analog control signal of said second control link having variable input and when connected to said output line having switching means selectively connecting said set point input to said analog memory amplifier in said second control link and switching said condition-indicating signal to said variable input and each of said remote stations being operatively independent one on the other.

10. Subject matter of claim 9 further including condition-responsive means sensing a parameter operatively connected to said switching means for selecting one of said control links to supply analog control signal to the process-controlling device in accordance with the sensed parameter.